Dec. 19, 1967   E. C. LEWIS   3,358,393

MOTORIZED TELEPHONE DIRECTORY

Filed April 12, 1965

INVENTOR
EARL C. LEWIS

BY *Misegades & Douglas*

ATTORNEYS

United States Patent Office 3,358,393
Patented Dec. 19, 1967

3,358,393
MOTORIZED TELEPHONE DIRECTORY
Earl C. Lewis, Box 1446, Midland, Tex. 79701
Filed Apr. 12, 1965, Ser. No. 447,490
7 Claims. (Cl. 40—31)

ABSTRACT OF THE DISCLOSURE

A motorized index directory having selective speed direction and control for traversing a length of scroll across a viewing window, in which said scroll is provided with spacially disposed tabs for engagement with a sprocket and dial arrangement.

The present invention relates to a new and improved mechanized or motorized index directory having a selective speed control means and a dial indicator showing which portion of a scroll or film is presented at a viewing window, and more particularly relates to a small and compact improved index directory for displaying telephone names, addresses, and numbers relative thereto, which may be selectively displayed from a viewing window and may be advanced or reversed by high and low speed motor drive units for reversing or forward driving the film on which the index information is displayed.

An object, therefore, of the present invention is to provide an improved telephone directory index system that selectively displays name, address, and telephone directory information from a microfilm through a magnified viewing window, and which film may be advanced or reversed at high and low speeds as selected, and in which an indicator shows which alphabetical portion of the index film is capable of being displayed from the viewing window when it is stopped or slowly advanced from the viewing window.

A further object of the present invention is to provide a one hand operable telephone directory index system providing an illuminated microfilm for showing selected index information from a magnified viewing window lens, and in which the film may be selectively and rapidly or slowly advanced or reversed, as desired.

The above and other objects and advantages of the invention will become apparent upon a full consideration of the following detailed description and accompanying drawings in which.

Figure 1:
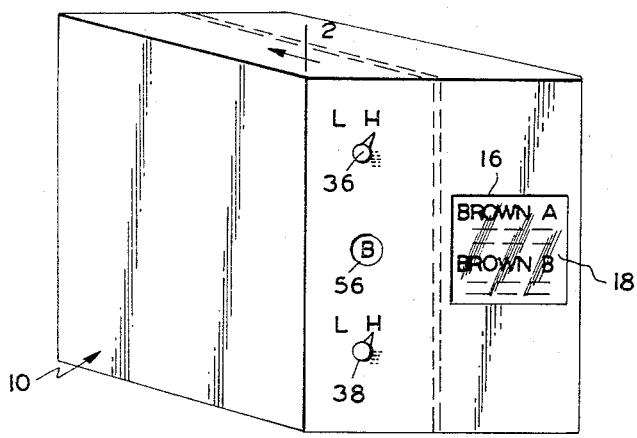
FIGURE 1 is a perspective view of the improved telephone index directory system in accordance with the preferred embodiment of the invention.
Figure 3:
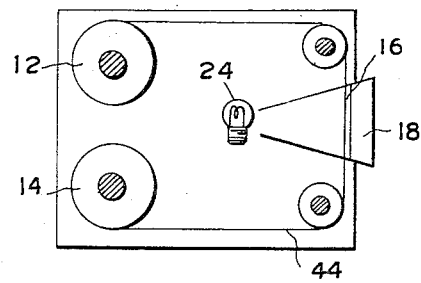
FIGURE 3 is a reduced or detailed view of the film and tape arrangement together with the viewing window taken along lines 3—3 of FIGURE 2.
Figure 2:
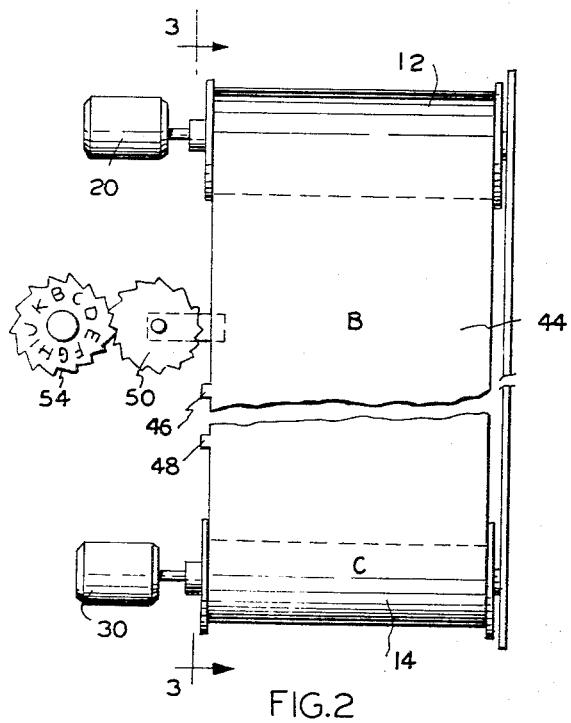
FIGURE 2 is a cross-sectional view taken along lines 2—2 of FIGURE 1, and showing the details of the film, motor, and dial indicator arrangement thereof.

Referring now to the drawings, there is shown a box 10 for a telephone index directory system, said box having a film storage reel 12 and a film take-up reel 14 mounted for rotation near the rear portion of the box 10, and in which intermediate portions of the film between the reels 12, 14 are disposed to pass across a path adjacent an aperture 16, said aperture being disposed to have a film lens or magnifying means 18 disposed thereon for magnifying the telephone index directory information that may be disposed on the film as it is positioned in front of said aperture.

Figure 4:
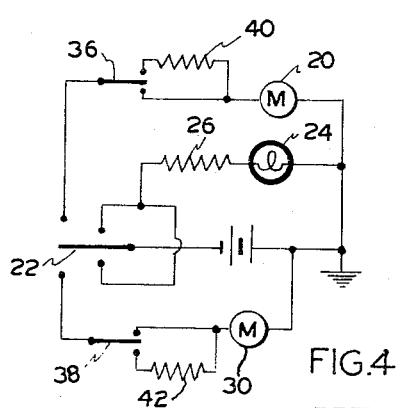
FIGURE 4 is a circuit diagram of the motor drive means.

Reel 12 is adapted to be driven by a motor 20 and is shown in the circuit diagram of FIGURE 4 so that as a twin contact single pole double throw switch 22 is closed for energizing motor 20, a light 24 is similarly energized in a parallel circuit with motor 20 so that the telephone directory index information on the film adjacent the aperture 16 is capable of being viewed through the lens 18. The light 24 may also have impedance means connected in circuit therewith such as a resistance 26, or a rectifier may be similarly disposed in circuit therewith in lieu of said resistance 26, as may be desired. The rectifier is often used in a D.C. motor circuit to damp inductance derived effects of the motor winding even though energized by a D.C. source, when under starting and stopping conditions caused upon opening and closing of a switch.

A motor 30 may be selectively driven as energized, as shown in FIGURE 4, by the single pole double throw switch 22 as above described, for driving the reel 14 in a take-up direction reverse to the take-up direction and motion of reel 12 as driven by motor 20. Either motor 20 or 30 may be driven fast or slow as desired depending upon whether switches 36, 38 connect in circuit the resistance 40 or 42, as shown in FIGURE 4, in such case that when the resistances 40, 42 are in circuit, the motor is driven slowly, whereas if the resistances 40, 42 are shunted out of circuit, the motor is driven at a fast relative speed.

Along the left-hand edge of the film 44 that is wound between the reels 12, 14, there is a series of tabs 46, 48 which are positioned to be indicative of an alphabetical portion of given significance along the length of the tapes, so that a tab therefore may indicate that the "B" portion is positioned in front of the aperture, or that portion "C" is positioned in front of the aperture 16. The tab 46 or 48 as it passes before the aperture 18, drives or actuates by physical engagement therewith an intermediate mechanical coupling means 50 including a sprocket means, so that the tab drives an intermediate mechanical coupling seen as a sprocket for a portion of a turn upon the tab momentarily engaging a tooth of the sprocket, which in turn drives an indicia-containing dial 54 mounted from the back of the front of the box so that the indicia thereon disposes that portion of the film of relative alphabetical significance that is being displayed through the aperture 16. The dial 54 is disposed therefore so that the selected given alphabetical indicia is displayed through an aperture 56, as shown in FIGURE 1. In this way, the telephone index directory system provides a ready and quick manner for selecting, either at high or low speed, a given alphabetical portion of an index directory film such as 44, so that a given name, with its pertinent address and telephone number, may be given in an informative and clearly legible way by a simple one-hand manual operation of either of two switch mechanisms.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A telephone index directory system comprising a box having a film storage reel and a film take-up reel mounted for rotation and positioned near the rear portion of the box, a motor drive means for driving each reel in a film take-up direction, a film disposed between the reels and having the portion intermediate the reels fed across a front aperture of said box, said film capable of having disposed thereon a series of index tabs for connotating particular indexed portions of a given alphabetical significance, a dial mounted behind the front of said box having a portion thereof in alignment with a second aperture and having indicia thereon relative to said given alphabetical significance, an intermediate mechanical coupling for driving said dial in response to momentary actuation of said index tabs traversing said intermediate mechanical coupling so that the dial displays through the second aperture in the front of said box that portion of the film of relative alphabetical significance.

2. A telephone index directory system comprising a box having a film storage reel and a film take-up reel mounted for rotation positioned at the rear portion thereof, a motor drive means for driving each reel in a film take-up direction selectively, resistance and current source circuitry means for selectively energizing one of the motor drive means at a fast or slow speed, a film disposed between the reels and fed across a front aperture of said box, said film having mounted thereon a series of index tabs for connotating particular indexed portions of a given alphabetical significance, a dial mounted behind the front of said box in which a portion thereof is in alignment with a second aperture in the box and having indicia disposed thereon relative to said alphabetical significance, an intermediate mechanical coupling means for driving said dial in response to the momentary passage and actuation by the index tabs traversing the intermediate mechanical coupling means, so that the dial displays through said box the portion of the film passing the second aperture which is of said given relative alphabetical significance.

3. The invention according to claim 2 wherein said intermediate mechanical coupling means is a tab actuable gear for driving said dial in step-by-step means, and a light disposed rearward of said aperture and disposed behind the film passing across said aperture for illuminating the film when either of said motor drive means is actuated.

4. The invention according to claim 3 in which the light is selectively connected with an impedance means in parallel to the motor drive means when said last means is energized.

5. The invention according to claim 4 wherein said switch is a single pole twin contact double throw switch means.

6. The invention according to claim 3 wherein telephone index directory information is disposed along the length of said film according to said given alphabetical significance arrangement.

7. The invention according to claim 2 wherein an optical lens is disposed over said aperture for magnifying information that is disposed along said film in alphabetical sequence for reading when the film is stopped in front of said aperture.

References Cited

UNITED STATES PATENTS

| | | | |
|---|---|---|---|
| 444,236 | 1/1891 | Rowe | 40—93 X |
| 1,373,966 | 4/1921 | Keyser | 40—31 |
| 2,419,802 | 4/1947 | Van Horne | 40—31 |
| 3,174,241 | 3/1965 | Rohan | 40—95 |

EUGENE R. CAPOZIO, *Primary Examiner.*

W. GRIEB, *Assistant Examiner.*